W. J. LEWIS,
Assignor to H. W. OLIVER, JR., D. B. & J. B. OLIVER.
Manufacture of Hinge Hooks.
No. 9,713. Reissued May 17, 1881.
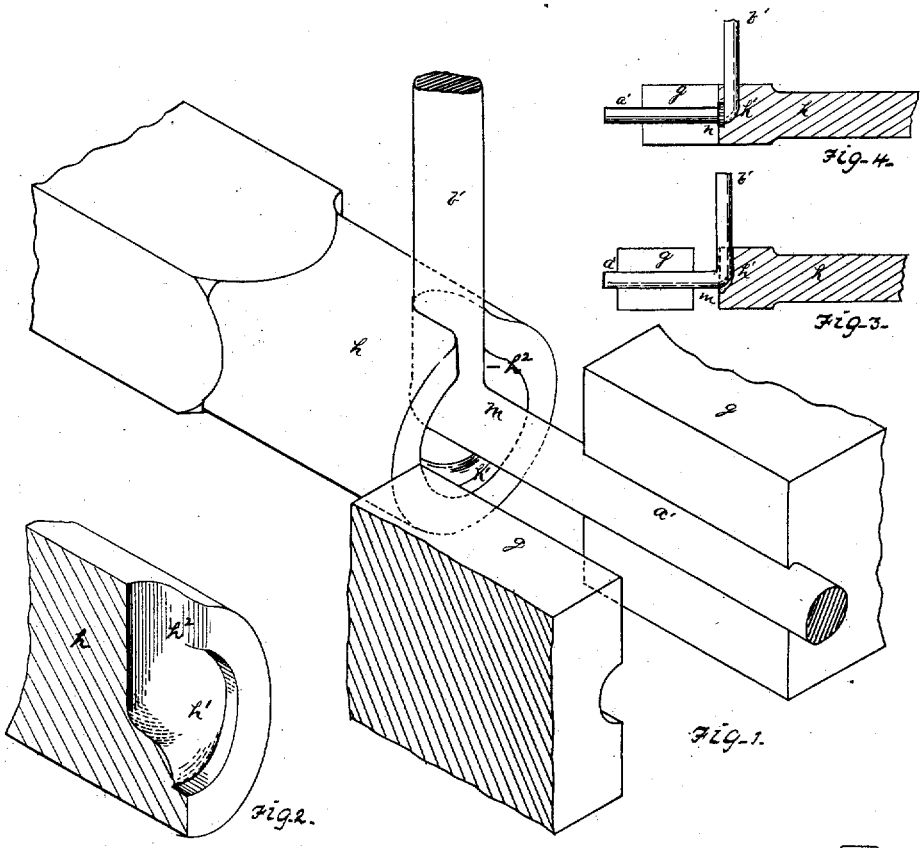
Fig. 1.
Fig. 4.
Fig. 3.
Fig. 2.
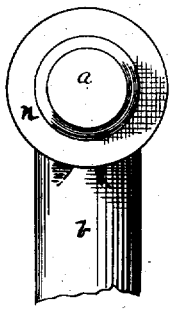
Fig. 7.
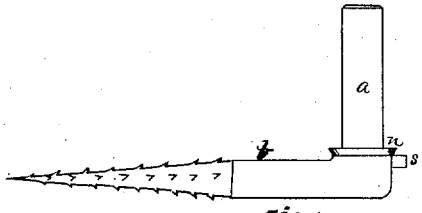
Fig. 6.
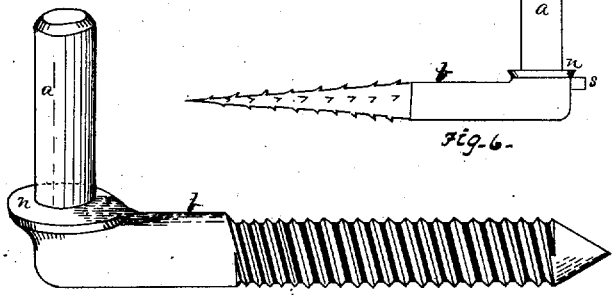
Fig. 5.
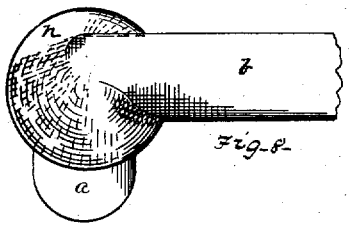
Fig. 8.
Witnesses.
R. A. Trinshall
Jno K Smith
Inventor
William J. Lewis
by his attys
Bakewell & Kerr
N. PETERS. Photo-Lithographer, Washington, D. C.

UNITED STATES PATENT OFFICE.

WILLIAM J. LEWIS, OF PITTSBURG, PA., ASSIGNOR TO HENRY W. OLIVER, JR., DAVID B. OLIVER, AND JAMES B. OLIVER, OF SAME PLACE.

MANUFACTURE OF HINGE-HOOKS.

SPECIFICATION forming part of Reissued Letters Patent No. 9,713, dated May 17, 1881.

Original No. 130,508, dated August 13, 1872. Application for reissue filed April 22, 1881.

*To all whom it may concern:*

Be it known that I, WILLIAM J. LEWIS, of Pittsburg, in the county of Allegheny and State of Pennsylvania, have invented a new and useful Improvement in the Manufacture of Hinge-Hooks; and I do hereby declare the following to be a full, clear, and exact description thereof, reference being had to the accompanying drawings, making part of this specification, in which—

Figure 1 is a perspective view of a set of dies such as I employ in the manufacture of hinge-hooks, such dies being represented as open and with a blank in position for griping and upsetting. Fig. 2 is a longitudinal vertical section of the upsetting-die of Fig. 1. Figs. 3 and 4 are reduced sectional views of the devices of Fig. 1 in different positions. Fig. 5 is a side view of the hinge-hook complete. Fig. 6 shows, by a like but reduced view, the same hook with a different attachment and a head for driving. Fig. 7 is a top view of the hook, and Fig. 8 is a bottom view.

Like letters of reference indicate like parts in each.

Heretofore in the manufacture of the hook half of a hook-and-eye hinge the pin has commonly been welded by hand-forging into an eye formed on the end of the shank. To save the hand-labor requisite in this operation, and at the same time produce a better article, I have devised a machine for making such hinge-hooks by upsetting the base end of the pin at the point of its junction with the shank, the rod or bar from which both are to be made being bent at the proper point for that purpose.

As the dies which constitute the operative parts may be combined with various forms and constructions of devices for imparting to them the motions desired, I will describe such dies with particular reference to the method of operation involved, and also will describe the article produced, which is of novel form, in that it has a seat or bearing for the eye part of the hinge at or around the base end of the pin and on one side of the shank, said seat being of greater diameter than the end of the shank directly under it.

On the end of an iron rod or bar, $a'$, I bend a sufficient length, $b'$, to form the shank $b$ of the half-hinge. The rod is then caught between a pair of griping-dies, $g$ $g$, with the bent end toward an upsetting-die, $h$, and with a sufficient length protruding beyond the ends of the griping-dies, as at $m$, to furnish material for upsetting or swaging an annular flange, $n$, around the base of the pin $a$, as shown in Fig. 4. The cavity $h'$ of the upsetting-die $h$ is of suitable form for this purpose. On the dies being opened and the work withdrawn the elbowed and upset end of the rod $a'$ is cut off at such point as to give a pin, $a$, of the length desired. A screw-thread is then cut on the shank $b$, as in Fig. 5, or a barbed point is made, as in Fig. 6, or an eye or other means of fastening, as may be preferred, is made, and after the usual finishing the article is ready for market or use.

The annular flange $n$ need not necessarily extend all the way around the base of the pin, its function being to provide a seat for the eye part or other half of the hinge, and such seat may be made longer or shorter, broad or narrow, as may be preferred. Also, it may be made inclined or of spiral form, as in cast-metal hook-and-eye hinges.

The same mode of manufacture may be applied to the making of the hook half of hook-and-eye butt-hinges.

If so preferred, the rod $a$ may be cut into blanks of suitable length and bent and upset separately.

The hinge-hook of Fig. 6 is to be driven into the post or frame. In order that the seat may not be upset by driving, I make on the outer end of the shank $b$, just below the seat $n$, a projecting head, $s$, which will receive the blows of the hammer. This head may be made on all that class of hooks which are to be driven in. It is made by means of a suitable cavity in the die $h$ at the same time and by the same operation that the seat is made.

It will be observed that in the method described a rod, bar, or blank is first bent to form the shank and pin, and after the bending is done a seat for the eye half of the hinge is upset at the base of the pin at or near its junction with the shank, and that these steps must follow each other in the order set forth. It will also be observed that the cavity $h'$ of the upsetting-die $h$ is of the proper shape to form the seat or bearing $n$ at one side of the shank against the opposed or anvil surface of the holding-dies, and that the upsetting-die has a lateral recess, $h^2$, through which the shank projects when it delivers its blow or blows.

What I claim as my invention, and desire to secure by Letters Patent, is—

1. In the manufacture of hinge-hooks, the method of operation substantially as hereinbefore set forth.

2. The hook half of a hook-and-eye hinge, made from a single wrought-iron rod or bar, with an upset seat, $n$, at the base of the pin, as an improved article of manufacture.

3. In the hook half of a hook-and-eye hinge, an upset head, $s$, in combination with an upset seat, $n$, substantially as set forth.

4. The hook half of a hook-and-eye hinge, having a seat at the base of the pin at one side of the shank, and of greater diameter than the end of the shank directly under it, substantially as and for the purpose described.

5. In a machine for forming hook-hinges, the combination of dies for holding the blank with an upsetting-die having a tapering concavity for forming the seat at one side of the shank and a lateral recess for the projection of the shank, substantially as described.

6. An upsetting-die for forming the hook half of hook-and-eye hinges, having a tapering cavity in its end and a lateral recess extending therefrom through the side, substantially as described and shown.

In witness whereof I have hereunto set my hand.

W. J. LEWIS.

Witnesses:
JAMES H. PORTE,
JAMES A. CARLIN.